H. R. HEYL.
Paper-Box Machine.

No. 132,077.

8 Sheets--Sheet 1.

Patented Oct. 8, 1872.

ATTEST.

INVENTOR

No. 132,077.

H. R. HEYL.
Paper-Box Machine.

8 Sheets--Sheet 2.

Patented Oct. 8, 1872.

ATTEST.
Jas. L. Ewin
Walter Allen

INVENTOR.
H. R. Heyl
By [his attorney]

H. R. HEYL.
Paper-Box Machine.
No. 132,077. Patented Oct. 8, 1872.
FIG. 4.
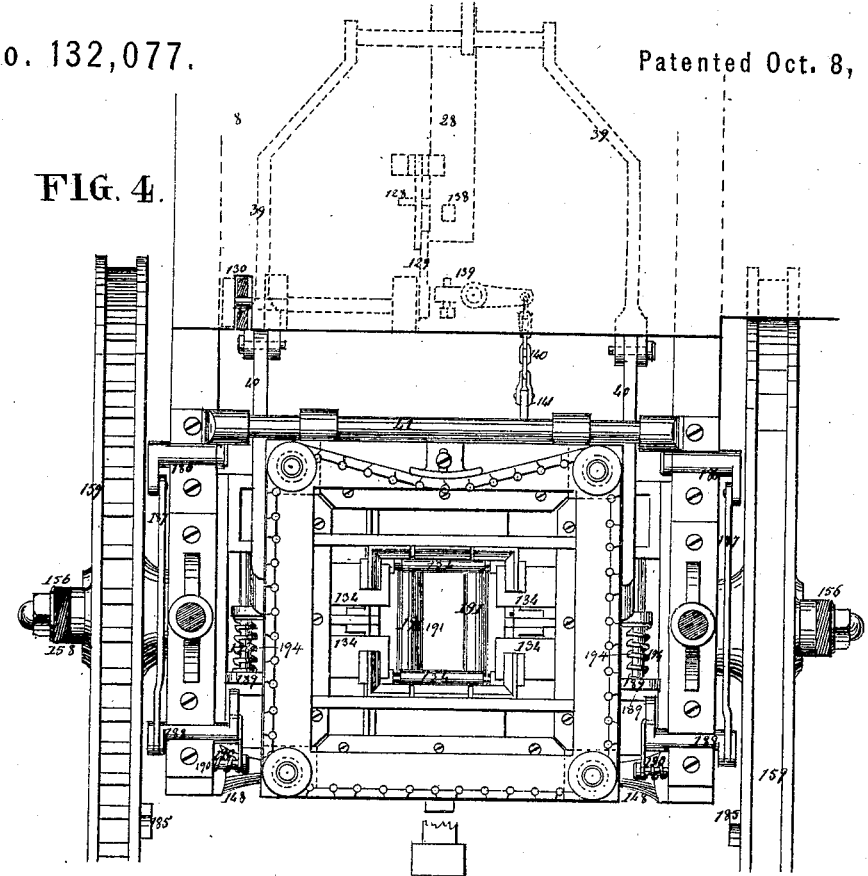
FIG. 5.
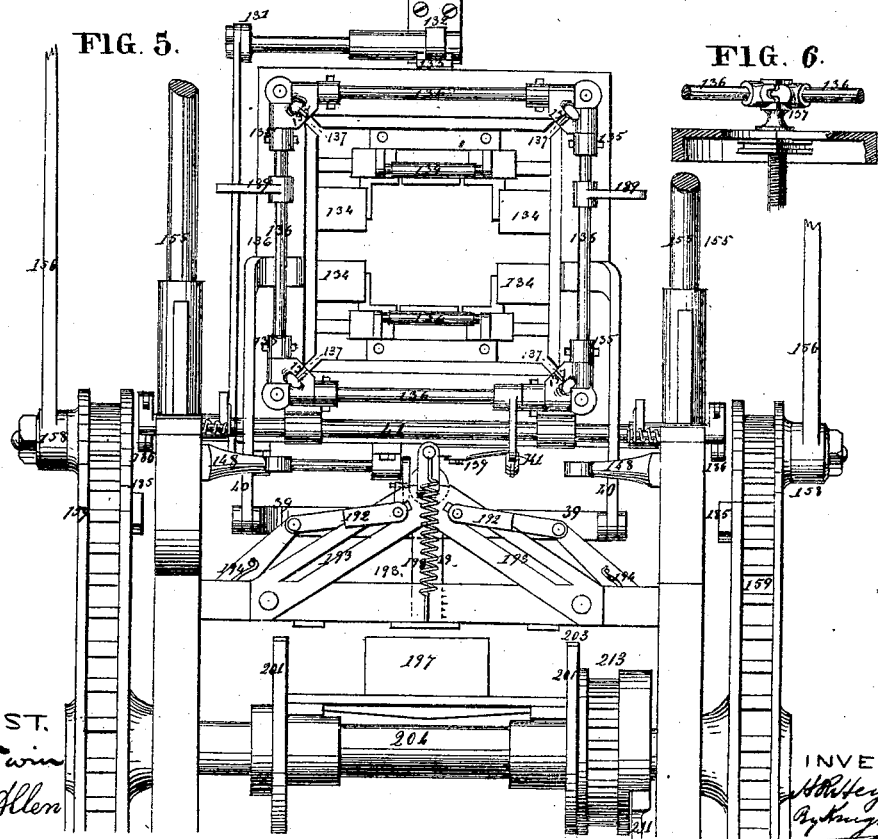
FIG. 6.
ATTEST.
Jas. L. Ewin
Walter Allen
INVENTOR.
H. R. Heyl
By Knight Bros
Attys

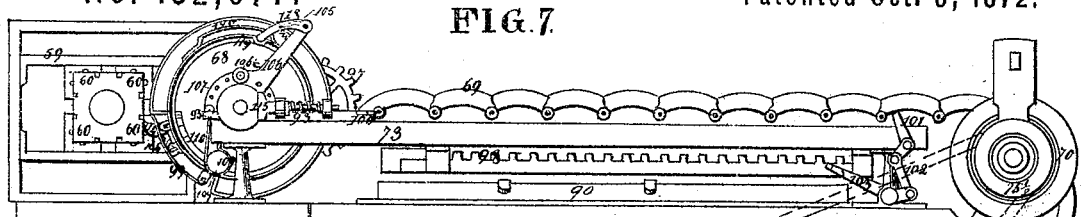

H. R. HEYL.
Paper-Box Machine.

No. 132,077.

8 Sheets--Sheet 6.

Patented Oct. 8, 1872.

ATTEST.
Jas. L. Ewin
Walter Allen

INVENTOR.
H. R. Heyl
By Kilgour
Atty.

AM. PHOTO-LITHOGRAPHIC CO. N.Y. (OSBORNE'S PROCESS)

H. R. HEYL.
Paper-Box Machine.

No. 132,077.

Patented Oct. 8, 1872.

ATTEST.
Jas. L. Ewin
Walter Allen

INVENTOR.
H. R. Heyl
By Knight Bros
Attys.

H. R. HEYL.
Paper-Box Machine.
No. 132,077.
Patented Oct. 8, 1872.
8 Sheets--Sheet 8.
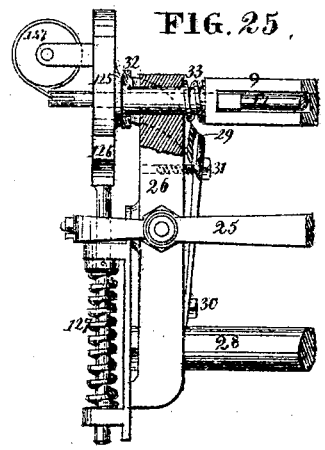
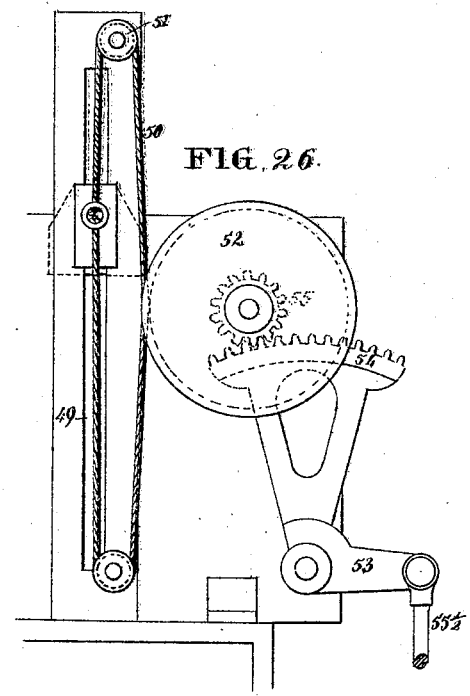
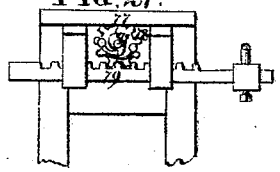
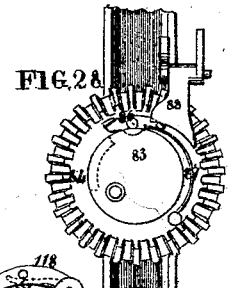
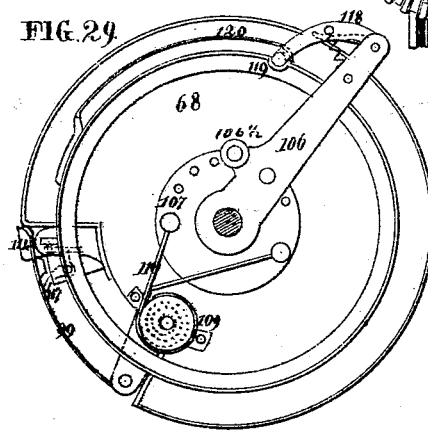
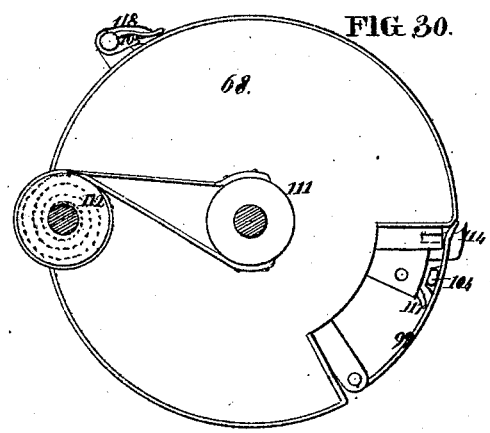
WITNESSES.
INVENTOR.

UNITED STATES PATENT OFFICE.

HENRY R. HEYL, OF PHILADELPHIA, PENNSYLVANIA, ASSIGNOR TO AMERICAN PAPER-BOX-MACHINE COMPANY, OF SAME PLACE.

IMPROVEMENT IN PAPER-BOX MACHINES.

Specification forming part of Letters Patent No. 132,077, dated October 8, 1872.

*To all whom it may concern:*

Be it known that I, HENRY R. HEYL, of Philadelphia, in the State of Pennsylvania, have invented certain Improvements in Machines for Making Paper Boxes, of which the following is a specification:

My invention relates to improvements in a machine for which a patent was granted to me on the 31st day of October, 1871. The said improvements consist, first, in devices for feeding the box-blanks or frames, securing them on the forming-plunger, and releasing them therefrom. Second, in devices for pasting and applying the cover-paper. Third, in devices for imparting alternate reciprocating and rotary movements to the plunger for crimping the box-frames and applying the covering thereto. Fourth, in devices for controlling the movement of the hinged molding-frame, securing it in its vertical position to receive the box and then releasing it. Fifth, in devices for operating the leaves and rollers which fold and smooth the edges of the covering upon the box bottom. Sixth, in devices for imparting and governing the movements of the vertical plunger and the parts thereof. Seventh, in devices for applying the "labels" to the bottom of the box and top of the cover.

Each of these heads embraces a number of distinct features of novelty, as will be hereinafter set forth.

Figure 1:
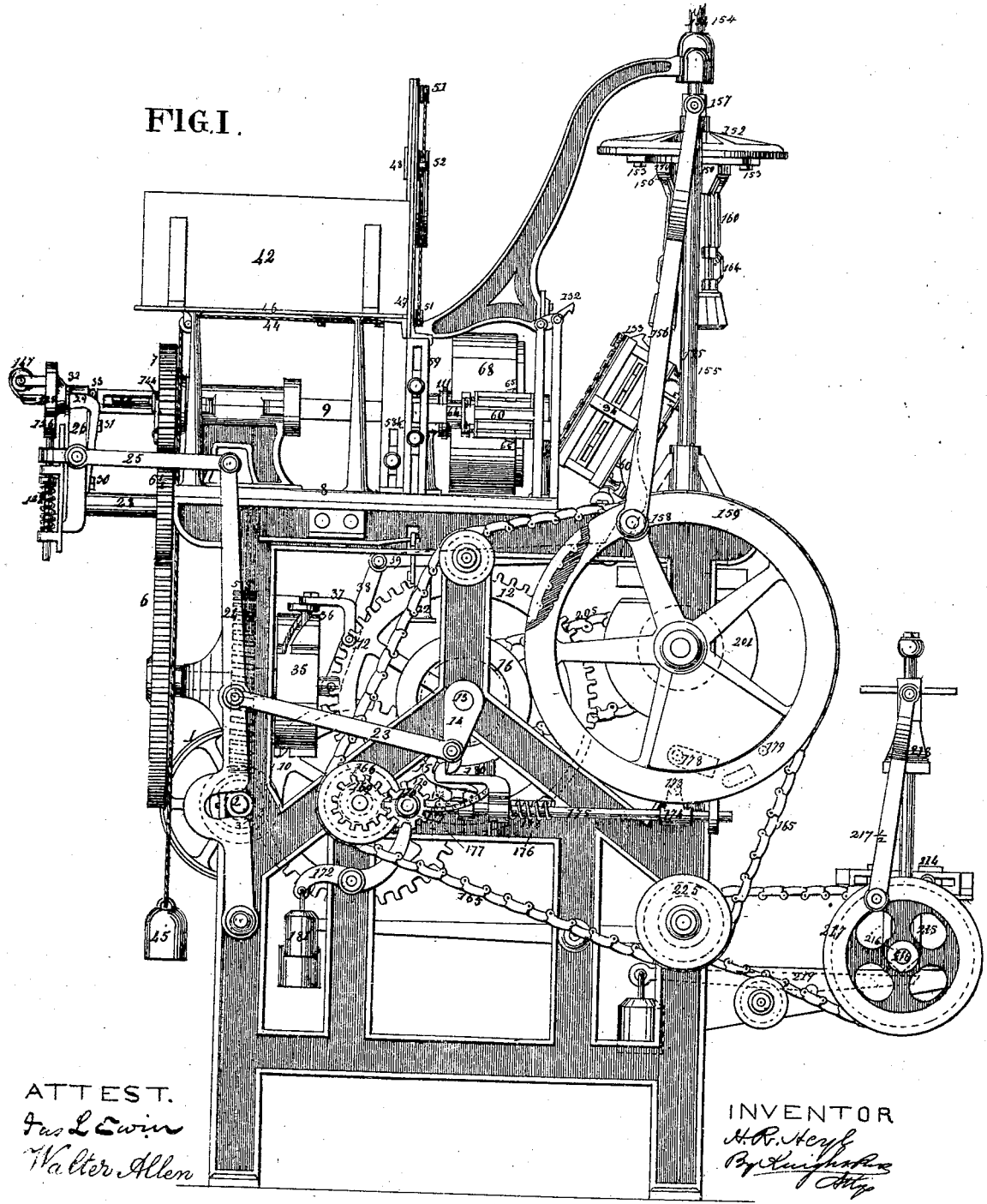
Figure 22:
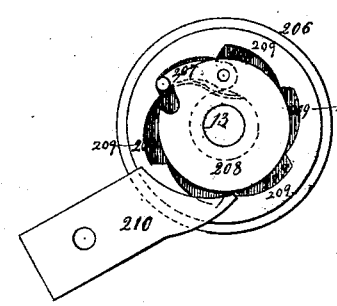
Figure 21:
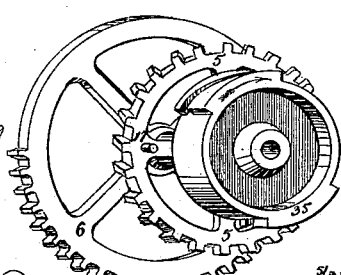
Figure 20:
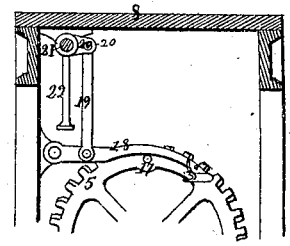
Figure 25:
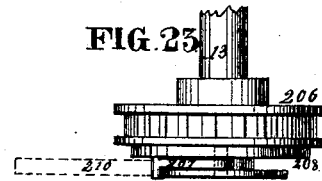
Figure 2:
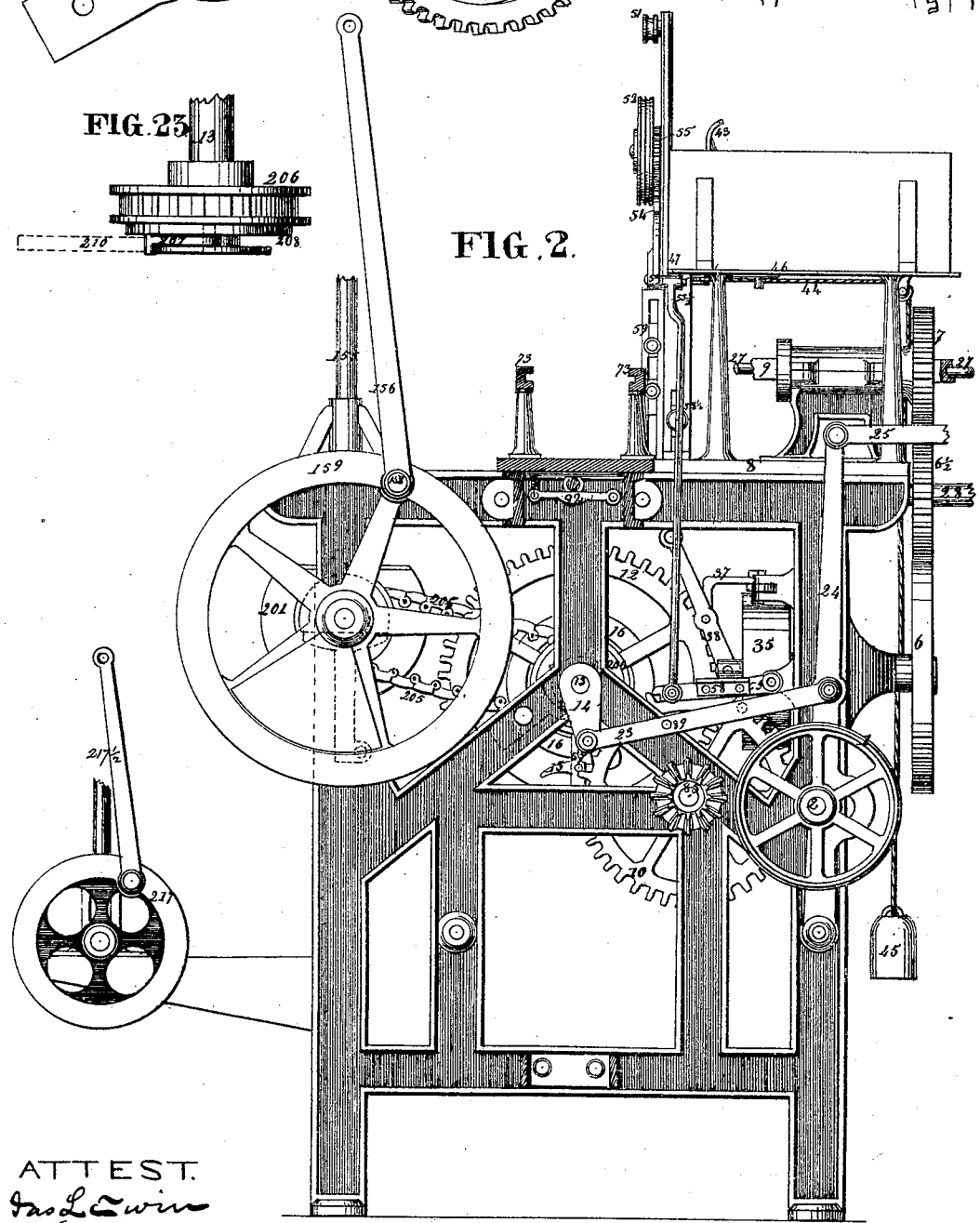
Figure 3:
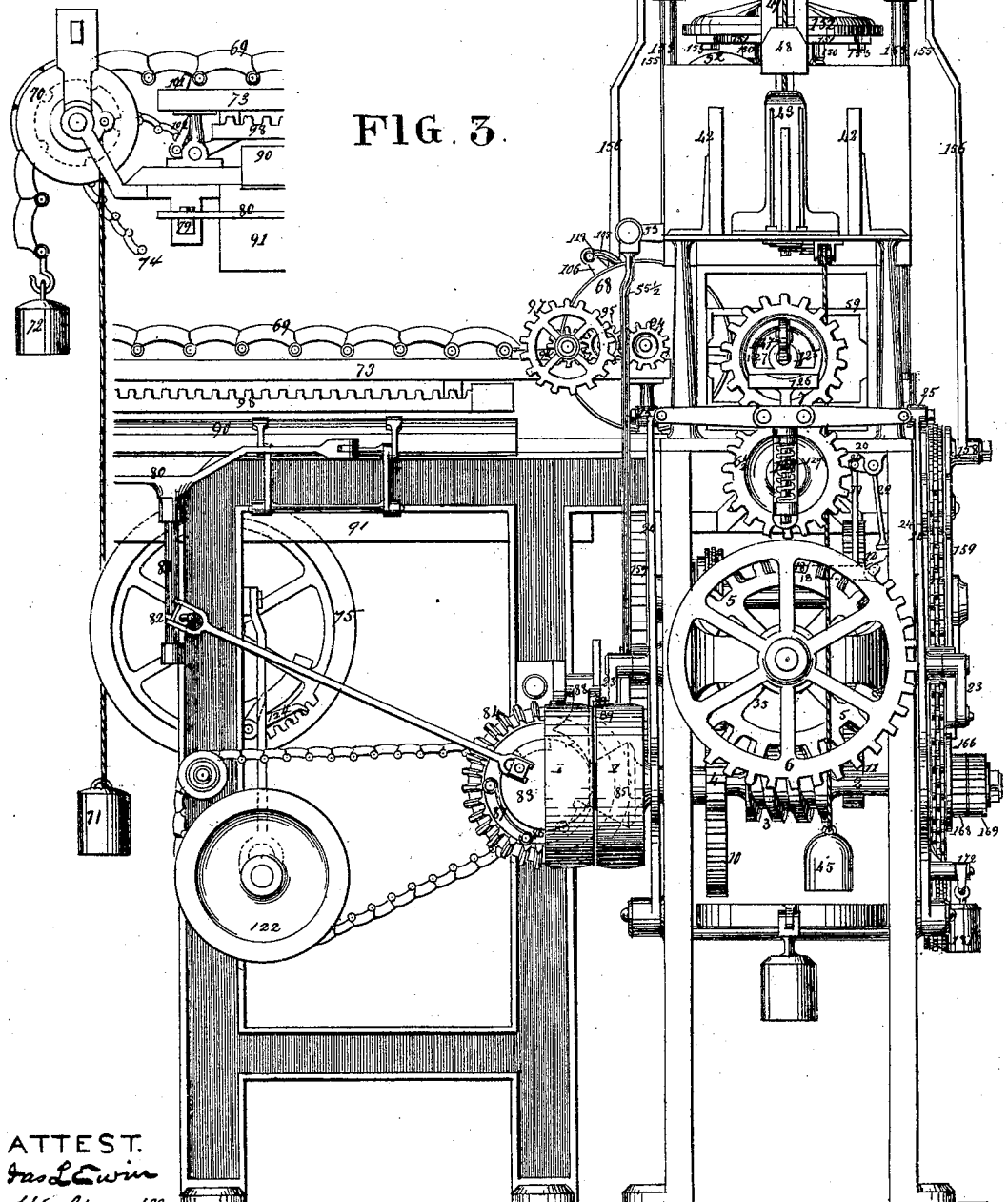
Figure 16:
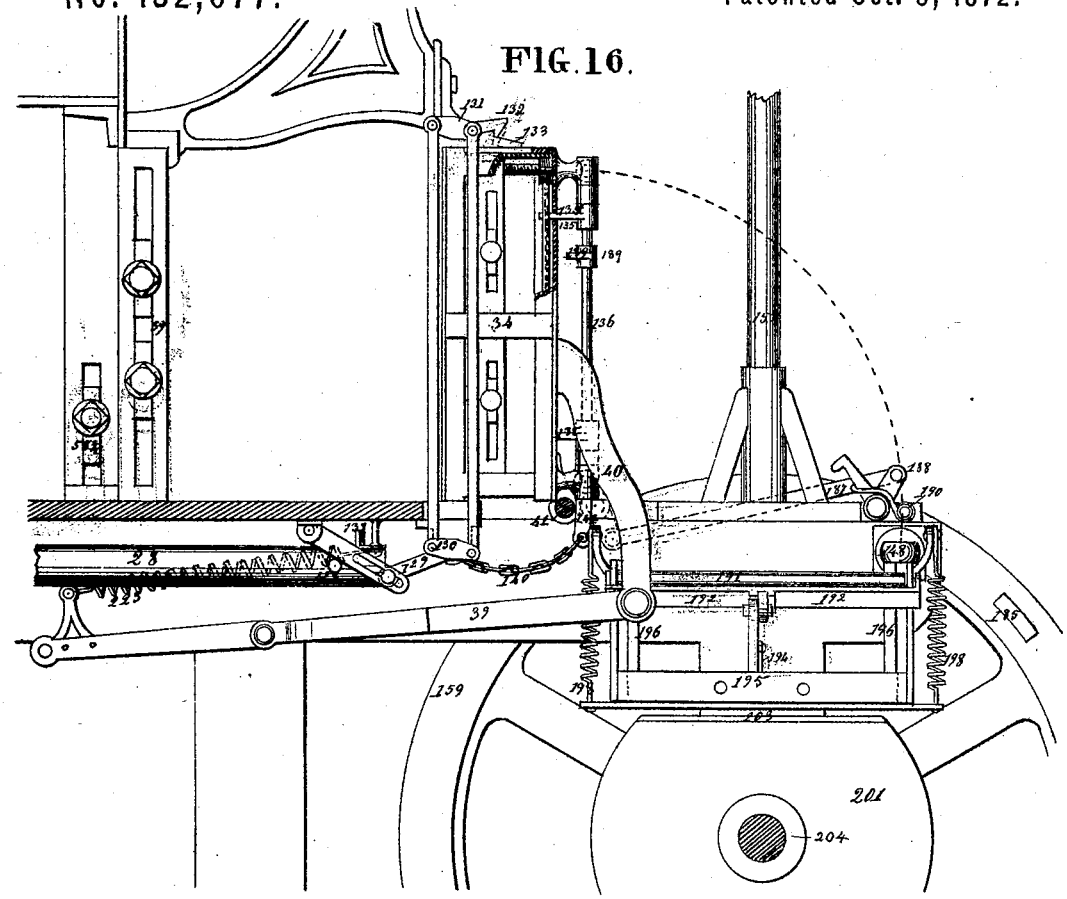
Figure 24:
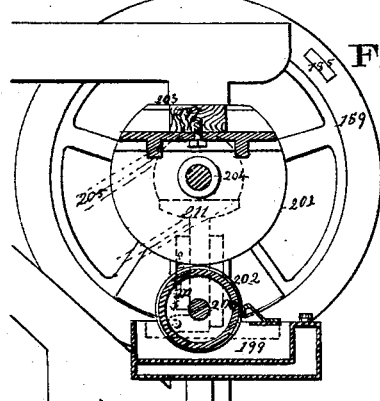
Figure 31:
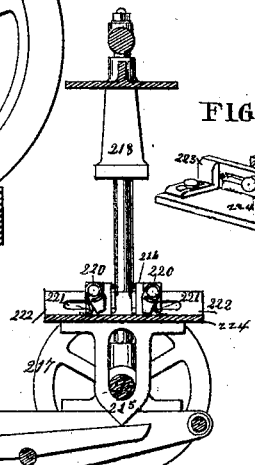
Figure 17:
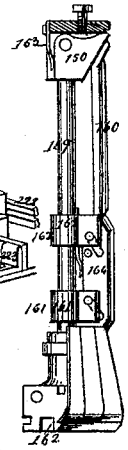
Figure 18:
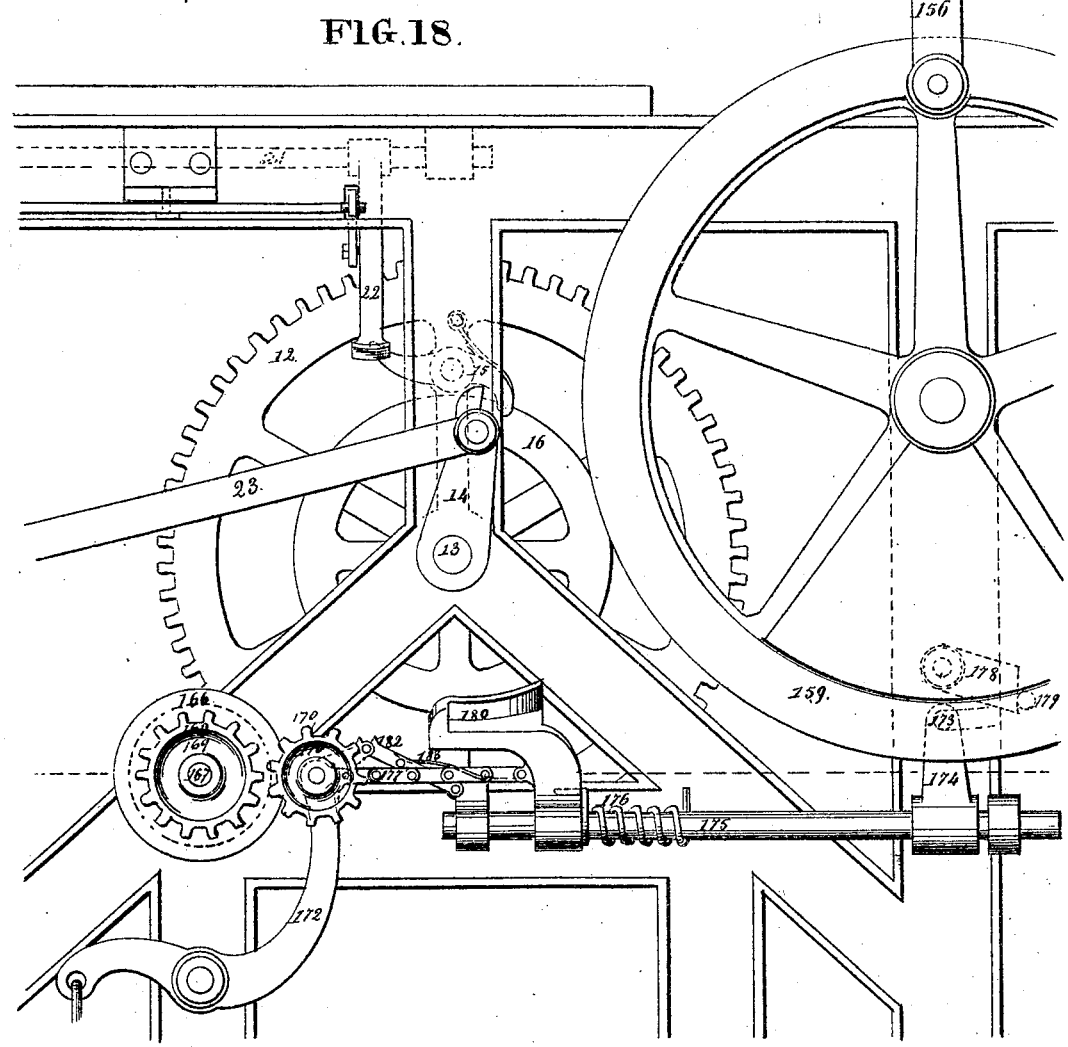
Figure 19:
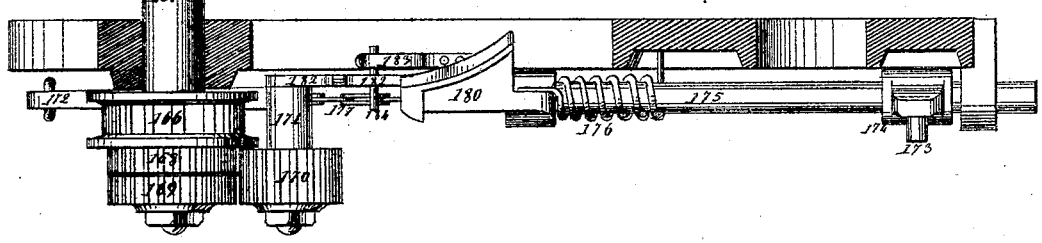

In the drawing, Fig. 1 is a side view of the machine as improved; Fig. 2 is an elevation of the other side of the same, the part to which the pasting apparatus is applied being shown in section; Fig. 3 is a rear view; Fig. 4 is a plan of the molding-frame, showing the mechanism employed to turn the edges of the cover-paper around the bottom corners of the box; Fig. 5 is a partial front view, showing the molding-frame in a vertical position; Fig. 6 is a section of one corner of the molding-frame; Fig. 7 is a front elevation of the mechanism for pasting and applying the cover-paper; Fig. 8 is a plan of the same; Fig. 9 is an elevation of a clutch movement employed to govern the mechanism last referred to; Fig. 10 is a transverse section of a platform and scraper employed for pasting the covering paper; Fig. 11 is a plan of the crimping-plunger, showing in horizontal section the compound sleeve by which the said plunger is rotated on its axis and permitted to reciprocate longitudinally; Fig. 12 is a vertical longitudinal section of said plunger and sleeve; Fig. 13 is a horizontal section of a portion of the hollow shaft of the plunger, showing the mechanism employed to control the longitudinal motion of the pusher-rod within said hollow shaft; Fig. 14 is a transverse section of the same in the plane indicated by the dotted line in Fig. 13; Fig. 15 is a perspective view of one of the cam-levers employed to operate the clips or nippers by which the box-frame is held upon the plunger; Fig. 16 is a side elevation partly in section, showing the folding frame locked in its first or vertical position and the mechanism for turning it down and up; Fig. 17 is a side elevation of one of the pendent arms of the vertical plunger; Fig. 18 is a side elevation of the mechanism employed to actuate and control the vertical plunger, showing the clutch movement out of gear; and Fig. 19 is a horizontal section indicated by the dotted line in Fig. 18. Fig. 20, Sheet 2, is an elevation of mechanism located in the rear of that shown in Figs. 18 and 19 and employed in connection therewith; Fig. 21 is a perspective view of a compound wheel employed to control the rotation of the horizontal plunger; Fig. 22 is an elevation, and Fig. 23 a plan, of a clutch movement to control the mechanism by which the bottom of the box or top of the lid is pasted to receive the label. Fig. 24, Sheet 6, is a vertical section of the said pasting mechanism; Fig. 25 is an elevation, partly in section, of the head-piece and its connected rods, hereinafter described; Fig. 26 is an elevation of mechanism for operating the blank feeding mechanism; Fig. 27 is an elevation of a device employed to invert the pasting-platform; Fig. 28 is an elevation of the clutch mechanism which controls the movement of devices employed to paste and apply the cover-paper, showing the clutch out of gear, which is shown in gear in Fig. 3; Figs. 29 and 30 are elevations of the respective faces of the pressing-cylinder which takes the cover-paper from the pasting apparatus and applies it to the box; and Fig. 31 is a perspective view of a portion of the label-holder, hereinafter described.

11, Fig. 3, are a fast and loose pulley, driven by belting from a counter-shaft, or in any convenient and proper manner. They are fastened on a shaft, 2, which carries a worm, 3, and pinion 4. The worm engages with a worm-wheel, 5, journaled transversely thereto in a traverse between the two principal frames, at the end of the machine. A mutilated wheel, 6, is also keyed on the shaft which carries the wheel 5, and engages during one-half of its revolution with a wheel, 7, through a transfer-wheel, 6½, between the two. The wheel 7 is journaled in bearings on the table 8, (see Fig. 1,) and its hollow axis carries a square plunger-shaft, 9, which is operated in a manner to be hereinafter described. The pinion 4 meshes with a wheel, 10, which, through the medium of a pinion, 11, on the same shaft as the wheel 10, rotates the wheel 12. The last-mentioned wheel runs loosely on a shaft, 13, which carries on each end outside of the principal frame a crank, 14. The crank-shaft 13 receives motion from the wheel 12 through a pawl, 15, (see Fig. 18,) fulcrumed thereon, which is intermittingly engaged in a notch on a side-wheel, 16, fastened to the crank-shaft. The worm-wheel 5 has a pin, 17, on its side, Figs. 20 and 21, which at each revolution raises a lever, 18, fulcrumed on the inside of the main frame, and connected by a rod, 19, to the arm 20 of a shaft 21 journaled beneath the table 8. The other end of the shaft 21, Figs. 18 and 20, is provided with a stem, 22, to engage with the tail of the pawl 15, and lift its nose out of the notch in the side-wheel 16, uncoupling this from the wheel 12, and allowing the latter to rotate by itself. The wheel 16, which drives the cranks 14, is thus allowed to rest until the nose of the pawl again engages in a notch of the side-wheel 16. This stoppage of the crank occurring at its uppermost point arrests the forward movement of the plunger-shaft 9 at half stroke to allow time for the rotation of the plunger, for the purpose of applying the wrapper to the box, as hereinafter explained. The movement of the cranks 14 through the rods 23 operates levers 24, fulcrumed to the lower part of the main frame of the machine, which levers draw forward rods 25, connected, as shown in Fig. 25, to a head-piece, 26, carrying at its upper end the square hollow plunger-shaft 9, which contains the pusher-rod 27, and fastened below to a rod, 28, which operates the locking device of the molding frame 34, and also the folding-leaves of the same, as hereinafter described. The connection between the head piece 26 and shaft 9 is effected through a forked piece, 29, attached by a screw, 30, at its lower end, and by an adjusting-screw, 31, near its upper end to the head-piece 26. The forked piece 29 carries a yoke, 32, which rests in a gland or notch in the neck of the plunger-shaft 9. The adjusting-screw 31 affords means of regulating the position of the plunger relatively to the folding-leaves 134 (by which the projecting edges of the cover-paper are turned around the bottom) to allow for variation in the thickness of pasteboard used. 33, Fig. 25, is a spiral spring, to press the plunger-shaft 9 as far forward as permitted by the set-screw 31. The molding-frame 34 turns on a shaft, 41, and is elevated to vertical or lowered to horizontal position by means of the wheel 35, having two diagonal grooves nearly on opposite sides of its periphery for receiving a pin, 36, on the arm 37, which is pivoted near the midlength of a lever, 38, connected to a forked rod, 39, the ends of which are jointed to arms 40 40 secured rigidly to the molding-frame and projecting below the hinge 41 on which it turns. The wheel 35 is secured to a sleeve in common with the worm-wheel 5 and the gear-wheel 6, by which the rotary movement of the plunger is produced. The sides 42 of the feed-box are adjustable at any necessary distance apart by any suitable means. The follower 43 is drawn forward by a cord, 44, passing over pulleys beneath the box, and having an attached weight, 45. The said follower is guided by a longitudinal slot, 46, in the middle of the box. At the bottom of the front part is a transverse slot or opening, 47, through which each successive blank is pushed downward by the vertically-reciprocating feeder, 48, to be submitted to the action of the horizontal plunger 60, which pushes it forward into the crimping-frame, by which the four sides of the blank are turned up so as to give approximately the size and shape of the box, as hereinafter described. The feeder 48, which successively carries down the blanks, works perpendicularly in a slot, 49, at the front of the box, and is operated by a cord, 50, passing over pulleys 51, near the top and bottom, in front of the box, and wound upon a spirally-grooved pulley, 52. The rotation of the pulley 52, to depress and elevate the feeder 48, is effected by means of a bell-crank lever, 53, upon whose upper arm is a toothed segment 54, gearing with a pinion, 55, attached to the side of the pulley 52. (See Fig. 26.) The horizontal arm of the bell-crank lever is connected by a rod, 55½, to a lever, 56, pivoted to the side of the machine, as shown in Fig. 2. A projection, 57, (Fig. 2,) on the end of the crank 14, strikes the end of the lever 56, so as to elevate the horizontal arm of the bell-crank 53, and thus draw down the feeder 48. The reverse movement to elevate the feeder is effected by a pin, indicated by dotted outline in Fig. 2, projecting from the inner face of the connecting-rod 23. This pin depresses the lever 56 by engaging over a ledge or flange, 58, projecting from said lever. At the moment when the blank has reached its lower position it is arrested by an adjustable stop, 58½, and is brought directly opposite the opening in the crimping-frame 59, the forward movement of the plunger 60 is commenced, pushing the blank through the crimping-frame, which throws the projecting sides of the blank against the sides of the plunger 60, and as the cam-lever 61 on the plunger-shaft 9 arrives at the opening 62 in the hollow shaft it is turned so as to assume a position longitudinal to said shaft, pushing forward the sliders 63, which are connected to the movable head 64 at back of the plunger 60. The opening or mouth of the groove 62, in which the cam-lever 61 works, is made as shown in Fig. 11, with one beveled or oblique side to deflect the cam-lever by the contact of its longer arm as the latter enters the groove. The pressing backward of the longer arm of the lever throws forward its shorter arm, which occupies a recess in the slide 63. This presses forward the said slider, distending the spring 63½ which connects it with the plunger-shaft 9. The sliders act simultaneously on the head 64 through the medium of springs 142, causing the head to press forward the nipper-rods 66 so long as the springs 142 are confined within the grooves 62. Near the respective ends of the screw-rods 66 are sleeves or collars 66½, so applied to the rods that the latter may turn freely within them, but will carry them in any longitudinal movement. The sleeves or collars 66½ rest, by friction-rollers or otherwise, against inclined planes 67 in the body of the plunger, so that the longitudinal motion imparted to the screw-rods through the medium of the cam-levers 61, sliders 63, springs 142, and head 64 will cause the nippers to be drawn inward simultaneously, in order to grasp the edges of the box-blank. This movement is not claimed in the present application, because it is set forth in my patent of October 31, 1871. The plunger 60 is made up of movable corner-sections, adjusted by set-screws to regulate the area of said plunger to correspond with the desired size of the boxes. The corner-sections contain the nippers 65 that hold the pasteboard to its place on the plunger while the covering-paper is being pasted around it. In order to grasp the pasteboard, the nippers 65 are moved forward and inward all at once by the action of the movable head or plate 64 against the nipper-rods 66, and the movement of the latter on the inclined planes 67 within the plunger. (See Figs. 11 and 12.) The nippers 65 may be shifted to any position in their grooves by turning the screw-rods 66, on which they are set. This adjustment adapts them for any desired depth of box. The forward movement of the plunger is still continued until it arrives directly opposite the face of the pressing-cylinder 68, when this movement is suspended, and a rotary motion is communicated to it in the following manner:

At the moment when the pawl 15, by which the fast-and-loose wheels 16 and 12 are engaged, is lifted out of its notch by the stem 22, operated from the worm-wheel 5 on the inner side of the mutilated wheel 6, the toothed part of the latter becomes engaged with the wheel 6½, turning the wheel 7, and causing the rotation of the plunger-shaft 9. The box body, being clamped to the plunger, is held against the pressing-cylinder 68, which is pressed up thereto by means of a fusee-chain, 69, attached at one end to a sliding carriage, 93, (Figs. 3, 7, and 8,) in which said cylinder is journaled, and passing over a pulley, 70, counterbalanced by weights 71 72. The preponderance of the weight 71 presses the cylinder 68 against the box on the plunger, as before stated. The pressing-cylinder 68 is caused to alternately advance and recede upon the horizontal frame 73 by means of a chain, 74, and wheel 75, actuated as hereinafter described. 76 is a reversible pasting platform, journaled within a paste-reservoir, 91, and having two flat and two curved sides. (See Figs. 8 and 10.) On the exterior part of its axis is a ratchet-wheel, 77, (Figs. 8 and 27,) of two teeth, and a loose cog-wheel, 78, which is caused to engage with the same by a pawl and spring (Fig. 27) during a part of the rotary motion of the table, and released therefrom during another part—that is, when the flat sides are horizontal. The loose wheel 78 gears with a rack, 79, which is caused to traverse the frame alternately back and forth by means of an arm, 80, attached to an upright shaft, 81, which, by means of a double-jointed arm, 82, is connected to a disk, 83, on a bevel-wheel, 84, gearing with a bevel-pinion, 85. The wheel 84 runs loose on the shaft of the disk 83, and moves it by means of the pawl 86, which, by a spring, 87, is pressed inward to cause it to engage with a projection between the disk 83 and wheel 84, shown by dotted line in Fig. 3. The said pawl is lifted out of contact with said projection by striking a curved swinging arm, 88, when said arm hangs in vertical position, being again engaged at each alternate rotation by reason of the arm 88 having been deflected by contact, with its upper end, of a pin, 89, projecting from the connecting-rod 23, as shown in Figs. 3, 7, 28, and others. The motion of the wheel 84 also produces the movement of the weighted chain 69, the arrangements for engaging and disengaging being so adjusted that, at the moment when the cylinder 68 is stationary and pressed against the plunger 60, the said cylinder is beyond the reach of the pasting-table and of the mechanism by which it is rotated to take the paper from said table, as hereinafter explained. At each forward movement of the rack 79, which imparts a semi-rotation to the pasting-platform, a scraper, 90, Figs. 7, 8, and 10, is carried over the said platform without contact therewith. At the reverse movement of the rack when the platform remains stationary the said scraper is drawn across the face of the platform to remove surplus paste therefrom into the reservoir 91. A piece of paper adapted for a wrapper being half an inch wider than the depth of the box to adapt it to lap above and below is then laid on the platform with its inner side down. 92, Fig. 2, is a stop to steady the platform, with one of its flat sides up. The pressing-cylinder 68 is rotated within the sliding carriage 93 (see Figs. 3, 7, and 8) by a pinion, 94, on its shaft gearing with an intermediate wheel, 95, driven by a pinion, 96, attached to a larger wheel, 97, which gears with a stationary rack, 98, as the carriage is moved back and forth by the chain 69. On the periphery of the pressing-cylinder 68 is a spring clip or nipper, 99, which, as the said cylinder reaches the backward extremity of its stroke, is opened to receive the projecting end of the wrapper paper by the following means: A projection, 100, upon the carriage 93, strikes the upper end of a bell-crank lever, 101, causing it, by the connecting-rod 102, to suddenly depress a knocker, 103, which strikes an arm, 104, projecting from the nipper 99 at the proper instant to cause said nipper to seize the end of the paper. The carriage 93 is then advanced again, the cylinder 68 being rotated forward by the gearing before described. The wrapper is thus taken from the platform 76 and laid upon the periphery of the cylinder 68, pasted side out, its rear end being held by spring-fingers 105, Fig. 8, mounted on an arm, 106. The arm is attached to a loose collar, 107, Fig. 7. To adapt the fingers to be changed in position to suit wrappers of varying length, the arm is made adjustable on the collar 107, and to give the fingers the necessary motion to catch and release the cover-paper, the collar 107 is made capable of a limited rotation around the axis of the cylinder 68. A spring-pulley, 109, Figs. 7 and 29, upon the cylinder, connected by double belts 110 to the collar 107, restores the fingers 105 to their normal position when they have been removed therefrom in either direction, and are again released. As the carriage reaches the end of its forward stroke the gearing is carried beyond reach of the racks 98, leaving the cylinder free to be turned by the plunger. Before coming in contact with the latter the said cylinder is placed in proper position by the action of the double bands 111, Figs. 8 and 30, attached to spring-pulley 112, and is then steadily held by a yielding T-brace, 113. The cylinder being thus accurately adjusted, the first part to come in contact with the side of the plunger will be a projecting tappet, 114, shown in Figs. 7, 29, and 30. The pressure upon this tappet being communicated through a lever 115 to a pivoted dog, 117, forces the tail of the latter outward against the clip 99, opening the said clip so as to release the forward end of the pasted wrapper, which is pressed against the box body upon the plunger 60, and caused to adhere thereto. The plunger then begins its rotation, winding the cover from the cylinder, which turns freely and presses the paper smoothly on all sides of the box. The holding-fingers 105 are governed by an outer finger, 118, Figs. 7 and 8, attached to their head and resting on a guiding-flange, 119, on the face of the cylinder 68, Fig. 29. When the fingers 105 are to hold the paper the outer finger 118 drops into a depression in the flange 119, as shown in Figs. 7 and 29. As the latter end of the wrapper approaches the box the arm 106, having been carried by the cylinder in its rotation, a roller or pin, 106½, on said arm, strikes the forward end of the carriage 93, which arrests its motion and causes the continued rotation of the cylinder to throw the finger 118 out of its cavity, slightly raising the holding-fingers 105 and releasing the end of the wrapper. The wrapper having been applied the carriage 93 is drawn back by the chain 69. The cylinder 68 and arm 106 immediately resume their normal positions, but the finger 118 being prevented by a spring-switch, 120, from re-entering in the flange from this direction, rests against the end of the said spring-switch until the cylinder having nearly completed its backward rotation brings the arm 106 against the rear end of the carriage 93, driving the finger 118 over the spring-switch 120, in readiness to pass under the forward end of said switch as soon as the forward rotation of the cylinder lays a new wrapper upon its periphery. The chain 74, by which motion is communicated from the wheel 75 to the pulley 75½, is attached at its ends to the said wheel 75 by adjusting screw-nuts 121. A single revolution of the crank-wheel 122, Figs. 7 and 9, imparts to the large wheel 75 two opposite oscillations to retract and again advance the carriage 93. This motion of the crank-wheel 122 is imparted at each fourth revolution of its shaft by a clutch movement, 123, controlled by compound grooves in the shaft, as shown in Figs. 9 and 10. A dog, 124, locks the wheel 75 so as to prevent any considerable backward movement of the carriage 93 until the proper period, but sufficient play is allowed to permit the cylinder to roll over the square corners of the plunger, the said cylinder being constantly pressed against the plunger by the action of the weight 71. A complete revolution of the plunger 60 to take the pasted wrapper from the cylinder 68 and roll it around the box is produced by the teeth, which extend around one-half of the periphery of the wheel 6. The rotary movement of the plunger is suspended as the plain half of the wheel 6 reaches the upper position, and the flat face of the segment 125, being then presented downward, is caught and held by the T-brace 126, said brace being pressed upward by the spring 127, Figs. 1, 3, and 25. The forward movement of the plunger is then resumed by the re-engagement of the fast and loose wheels 16, 12, causing the crank 14 to revolve, as before explained. The relative arrangement is such that when the rotary movement of the plunger is suspended and its forward movement resumed the rotation of the grooved wheel 35 in the direction shown by the arrow in Fig. 21 will, through the pin 36, Fig. 1, and the connections 37, 38, and 39, throw up the molding-frame 34 to receive the plunger. The rod 28 is advanced by the head 26 simultaneously with the plunger, and when the molding-frame reaches a vertical position a pin, 128, Fig. 16, on said rod, raises the toggle-levers 129, imparting a rocking motion to the connected cross-heads 130 and 131, drawing down the latch 132, which is attached rigidly to the shaft of the cross-heads 131, and is thus made to catch a hook, 133, on the upper side of the molding-frame. (See also Figs. 1 and 4.) As the forward movement of the plunger carrying the box progresses it forces the box within the said molding-frame, and as the bottom of the box reaches the bottom of the frame a series of folding leaves, 134, Figs. 4 and 5, are slidden inward simultaneously from all sides, turning in the projecting edges of the cover paper and forming a lap around the bottom of the box. The leaves work in suitable guides and are advanced and retracted by arms 135, Figs. 5, 6, and 16, projecting from rock-shafts 136, which are geared together by segment-pinions 137 at their ends so as to move together. This inward movement of the folding leaves 134 is produced by a pin, 138, on the rod 28, Fig. 16, impinging against the short end of a lever, 139, Fig. 4, pivoted beneath the table 8, as shown in dotted lines, and connected by a chain, 140, with an arm, 141, on one of the rock-shafts, 136, Figs. 5 and 16. Rollers may be substituted for the leaves 134 on two or more sides, if preferred. As the plunger reaches its foremost position springs 142 attached to the rod 63, which operate the nippers, escape from the box or sleeve within which the plunger-shaft slides, (see Fig. 12,) and, by bowing outward, instantly retract the nippers to a slight extent, sufficient to release the box from the plunger. The plunger is then drawn back by the continued movement of the crank 14, leaving the box within the molding-frame 34, where it is held by a pusher, 143, fitted to slide concentrically within the plunger 60. The stoppage of the pusher is effected by a spring-bolt, 144, projecting through a slot, 145, in the shaft 9 and engaging in a notch in the pusher-rod. (See Figs. 13 and 14.) As the oblique end 146 of the slot reaches the bolt 144 it presses it backward out of the notch in the pusher-rod, when the pusher is instantly retracted by a spring-pulley, 147, Figs. 1 and 25, restoring the pusher-head to the cavity provided for it in the face of the plunger and permitting the pusher to accompany the plunger in its retrograde movement. The operating parts are now in such relative positions that the groove in the wheel 35 has commenced its backwardly-pulling action on the pin 36, causing, through the connections before described, the depression of the arms 40, which support the molding-frame until this is lowered into horizontal position directly below the vertical plunger, where its outer edge rests on supports 148, Figs. 4, 5, and 16. A spring, 223, is employed to counterbalance the molding-frame, so that it may move freely and rest in either position. The vertical plunger is made up of four pendent arms, 149, Fig. 17, the lower ends of which form the head of the plunger, and whose upper ends are hinged to heel-plates 150, which permit the arms to be pressed inward, but not outward beyond a vertical position. The plates 150 may be adjusted readily within slots 151 in the supporting-frame 152, Fig. 1, and secured by clamp-nuts 153 to give any desired area to the plunger. The arms 149 are pressed diagonally outward to their vertical positions by springs 163 bearing against the plates 150. (See Fig. 17.) The frame is sleeved on a vertical shaft, 154, secured to the frame of the machine, and is guided in its reciprocating motion by the rods 155 at either side of the end of the frame. The reciprocating movement is produced by connecting-rods 156 attached above to a cross-beam, 157, and below to wrists 158 on wheels 159, Figs. 1, 2, and 3. Guides 160 are fastened to the angle-pieces 150 at top, and to collars 161, two of which are attached to each of the arms 149, Fig. 17. The enlarged lower ends of the arms are beveled on their outer sides to adapt them to pass into the beveled upper part of the molding-frame. Their under surfaces are formed with slots or grooves 162 adapted to receive the projecting upper edges of the cover paper, which projecting edges are, by the descent of the plunger, carried down within the box and laid neatly and smoothly on the inside thereof, and the box is carried down completely through the frame, the folding leaves 134 being retracted from beneath it just before the plunger reaches the bottom of the box. The retraction of the folding leaves is effected by the following means: Projections 185, Figs. 4 and 16, inside the rims of the wheels 159, impinge against the ends of arms 186, connected, by rods 187, to double crank-shaft 188 mounted on top of the frame, causing the free ends of said crank-shafts to descend suddenly and drive down arms 189 projecting from the rock-shafts 136, thereby turning said shafts backward. The crank-shafts 188 are then retracted by springs 190. As the box is carried down through the molding-frame its bottom is received on horizontal rollers 191, Figs. 4, 5, and 16, journaled in a jointed frame, 192. The pivots of the rollers work also in oblique slots in a stationary guide-frame, 193, so that as the rollers are forced downward by the pressure of the box they run outward across its bottom and are pressed against the sides thereof by the action of springs 194. The box-bottom now rests on bars 195 in a frame, 196, which slides vertically in the frame 193, and when the box is carried to its lowest position its bottom is brought in contact with a reversible pasting-platform, 197, Fig. 24, from which it receives a supply of paste in readiness for the application of the label. As the plunger rises springs 198, drawing up the frame 196, retract the box from the platform 197, and the arms 149 are pressed inward out of contact with the box by the action of corner-plates 164, attached by oblique slots, through which pass pins in the collars 161, as shown in Figs. 1 and 17. The obliquity of the slots in the plates 164 causes said plates to offer no resistance to the outward pressure of the plunger-arms while they are descending; but while they are ascending, said plates, slipping downward, project to a greater distance and bear rigidly against the corners of the molding-frame above the top of the box, and thus press the arms inward, overcoming the force of the springs 163 and leaving the box beneath the molding-frame. The pitman-wheels 159 are driven by chains 165, Fig. 1, or their equivalent, from a loose pulley, 166, Fig. 19, on the shaft 167, to which pulley 166 a cog-wheel, 168, is attached. The shaft 167 carries a fast wheel, 169, from which motion is communicated at proper intervals by a pinion, 170, adapted to gear with both wheels 168 and 169, and thrown in and out in the following manner: The pinion 170 is mounted loosely on a stud-shaft, 171, projecting horizontally from the upper end of a bell-crank lever, 172. See Figs. 1, 18, and 19. The pinion is drawn and held out of gear by the action of one of the wheels, 159, a cavity in which, shown at its lower part in dotted lines in Fig. 18, catches a pin, 173, projecting laterally from an arm, 174, on a rock-shaft, 175, which rock-shaft, when at rest, is so held by a spring, 176, as to press the pin 173 against the inner face of the rim of the wheel 159 and adapt it to catch in the cavity in said rim when the cavity is brought to the pin by the rotation of the wheel. Said rotary movement then draws the shaft endwise, and by the chain 177, connecting said shaft with the bell-crank lever 172, draws the pulley out of gear. The wheel is then caught and held against retrogression by a dog, 178, catching behind a pin, 179, while its further progression is prevented by the shaft 175 and attachments. This position of the parts is shown in Fig. 18. When the time comes for the wheel to perform another revolution the crank 14, pressing sidewise against an oblique tappet, 180, on the rock-shaft 175, withdraws the pin 173 from its cavity in the wheel 159, and also drives the shaft endwise toward the shaft 167, loosening the chain 177 and permitting a weight, 181, on the lever 172 to draw the pinion 170 into gear. The parts are then locked in this position by a knuckle-jointed bar, 182, which is pressed down by a spring, 183. The tappet 180 is immediately released from the crank 14 so that the pin 173 is again thrown against the rim of the wheel; but it is now out of reach of the notch or cavity therein. The wheels 159 are then made to perform another revolution, carrying the plungers down and up again, when the pin 173 catching in the cavity in the wheel draws the shaft 175 endwise, the first effect of which is to straighten the chain 177. The contact of the chain with a pin, 184, on the jointed bar 182 throws up the said bar when the pinion is instantly pulled out of gear and the wheels 159 are locked as before. It is manifest that springs and weights may be substituted one for the other in various parts of this movement. The platform 197 receives paste from a reservoir, 199, Fig. 24, through a roller, 200, which is revolved in the said reservoir by friction-wheels 201 202, between which the said platform and roller are respectively mounted. The wheels 201 are formed with flat parts 203 corresponding in position and in radial distance from the axis 204 with the surface of the platform or paste-block 197, so that as the said platform in its revolution reaches the roller 200 its surface will roll over the latter and receive paste therefrom. The intermittent rotation of the shaft 204 is derived from the shaft 13 through the endless chain 205 running on a clutch-pulley, 206, the said pulley being thrown out of gear each time the crank 14 rests in its uppermost position. This result is effected by means of a spring-pawl, 207, pivoted on a disk, 208, keyed to the shaft 13 and engaging in any one of the notches 209, Figs. 22 and 23, but retracted by contact with a stationary finger, 210. When the platform is turned up the platform-shaft is thus released from the driving mechanism, but is held accurately in position by a T-brace, 211, Fig. 24, pressed upward by a spring, 212, against a flat surface prepared for it on the chain-wheel 213. The apparatus for pasting the labels to the boxes may consist of a box formed of four corner-sections, 214, (three of which are shown in the fragmentary perspective view, Fig. 31,) attached adjustably to slotted bars 222, which are secured at their ends to knees 223 slotted to permit their adjustment on the bed 224, so that the bars 222 may be set at a greater or less distance asunder. The bed 224 is guided in a vertical path, and is supported by brackets 215 resting on weighted levers 219 to permit the bed to adapt itself to the varying thickness of the pack of labels. 218 is a plunger working on suitable guides and reciprocated through the medium of rods 217½ connected to crank-wheels 217, which are mounted on a shaft, 216, and rotated by means of a chain connecting with a pulley, 225, as shown in Fig. 1. The pulley 225 is driven by the chain 165 from the pulley 166, the motion being effected at proper intervals by the clutch mechanism already described. The shaft 216 passing through slots in the brackets 215 limits the upward-and-downward movement of the bed 224 under the opposing influences of the levers 219 and plunger 218. The adjustable box-sections 214 are provided on their inner sides with pivoted fingers 220, pressed outward by springs 221, by which their lower ends are held against the corners of the pack of labels. The labels are thus held in concentric position. A paper box, its bottom having been covered with paste in the manner before described, is placed by hand over the mouth of the label-box, and by the downward movement of the plunger 218 is forced against the upper one of the labels to become firmly attached thereto, the fingers 220 opening sufficiently under the pressure to release the label on top, but being immediately closed down on those below by the springs 221.

Claims.

I claim as my invention—

1. The levers 61 pivoted to the plunger-shaft 9 and pressing forward the slide-bars 63, in the manner described, in order to contract the nippers 65.

2. The reversible pasting-platform 76, constructed with two flat and two curved sides and combined with the reservoir 91, and pressing-cylinder 68.

3. The combined switch 120 and nippers 105 for holding and releasing the rear end of the cover paper on the pressing cylinder, substantially as described.

4. The chain and rack and pinion for advancing, retracting, and rotating the pressing-cylinder, substantially as described.

5. The head-piece 26, clutch-gearing 12 and 16, cranks 14, connections 23 24 25, and gearing 6, 6½, and 7 for imparting alternate reciprocating and rotary movement to the horizontal plunger, substantially as set forth.

6. The holding devices 129, 130, 131, and 132, employed in combination with the molding-frame to secure it in its vertical position.

7. The connected shafts 136 and arms 135, actuated by the arms 141 and 189, for operating the folding-leaves or rollers in the molding-frame, substantially as described.

8. The obliquely-moving plates 164 acting to permit the expansion of the plunger in its descent and contract it in its ascent by contact with the molding-frame, substantially as described.

9. The reciprocating rollers 191, carrying frame 192 and inclined guides 193, combined to operate substantially as set forth.

10. The rock-shaft 175, clutch-arm 174, and tapppet 180 operating in connection with the wheel 159 and crank 14, substantially as described.

11. The driving and clutch pinions 166, 168, 169, and 170, combined to operate substantially as described.

12. The combination of the chain 177 and jointed rod 182 to throw the clutch-pinion 170 in and out of gear, substantially as and for the purposes described.

13. The platform 197, wheels 201 and 202, and paste-roller 200, combined to operate substantially as and for the purposes herein set forth.

14. The label-box, constructed with corner-sections 214, adjustable to suit labels of various sizes and provided with yielding fingers 220, substantially as and for the purposes set forth.

15. The combination of the label-holder 214 223 224, brackets 215, levers 219, plungers 218, wheels 217, and pitman 217½, substantially as and for the purposes set forth.

HENRY R. HEYL.

Witnesses:
OCTAVIUS KNIGHT,
WM. H. BRERETON, Jr.